United States Patent
Cariccia et al.

(10) Patent No.: US 12,331,822 B2
(45) Date of Patent: Jun. 17, 2025

(54) FILTERING PULLEY

(71) Applicant: PROPULSION SOLUTIONS S.R..L., Ivrea (IT)

(72) Inventors: Gianluca Cariccia, Ivrea (IT); Andrea Guala, Ivrea (IT); Gilberto Delle Rose, Ivrea (IT)

(73) Assignee: MUVIQ S.R.L., Ivrea (IT)

( * ) Notice: Subject to any disclaimer, the term of this patent is extended or adjusted under 35 U.S.C. 154(b) by 0 days.

(21) Appl. No.: 18/580,326

(22) PCT Filed: Jul. 21, 2022

(86) PCT No.: PCT/IB2022/056727
§ 371 (c)(1),
(2) Date: Jan. 18, 2024

(87) PCT Pub. No.: WO2023/002419
PCT Pub. Date: Jan. 26, 2023

(65) Prior Publication Data
US 2025/0092946 A1    Mar. 20, 2025

(30) Foreign Application Priority Data
Jul. 21, 2021 (IT) .......................... 102021000019376

(51) Int. Cl.
*F16H 55/36* (2006.01)
*F16F 15/121* (2006.01)

(52) U.S. Cl.
CPC ......... *F16H 55/36* (2013.01); *F16F 15/1216* (2013.01); *F16H 2055/366* (2013.01)

(58) Field of Classification Search
CPC .... F16H 55/36; F16H 2055/366; F16H 35/10; F16D 3/12; F16D 2300/22; F16F 15/1216
(Continued)

(56) References Cited

U.S. PATENT DOCUMENTS 6,083,130 A * 7/2000 Mevissen .................. F16D 3/72
474/69
7,153,227 B2 * 12/2006 Dell .......................... F16D 3/12
474/70
(Continued)

FOREIGN PATENT DOCUMENTS

DE    102019112738 A1    11/2020
WO    2012/061936 A1    5/2012

OTHER PUBLICATIONS

International Search Report and Written Opinion, Application No. PCT/IB2022/056727, Jul. 21, 2022, p. 1-9.

*Primary Examiner* — Henry Y Liu
(74) *Attorney, Agent, or Firm* — FisherBroyles, LLP; Susan M. Oiler

(57) ABSTRACT

Filtering pulleys for an accessory transmission of an internal combustion engine have a hub, an annular crown provided with a profile configured to cooperate with a transmission belt positioned externally coaxial around an axis (A) to the hub and supported in rotationally free motion on the hub itself, and a filtering unit for transmitting the torque interposed between the hub and the annular crown. The filtering unit has a torsion spring, a carrier, and a torque limiting joint cooperating with each other to transmit a torque between the hub and the crown. The filtering pulleys can include a damping means carried by a member that is integral with one of the hub and crown and configured to provide variable damping according to the torque.

14 Claims, 5 Drawing Sheets

(58) Field of Classification Search
USPC .................................................. 474/70, 94
See application file for complete search history.

(56) References Cited

U.S. PATENT DOCUMENTS

| | | | | |
|---|---|---|---|---|
| 7,604,542 B2* | 10/2009 | Bach | ..................... | F16F 15/137 464/27 |
| 7,975,821 B2* | 7/2011 | Antchak | ............... | F16D 41/206 474/70 |
| 8,132,657 B2* | 3/2012 | Antchak | ................. | F16D 7/022 474/70 |
| 8,308,590 B2* | 11/2012 | Fiordaliso | ................ | F16D 3/80 474/166 |
| 9,033,832 B1* | 5/2015 | Serkh | .................... | F16D 41/206 474/70 |
| 9,182,029 B2* | 11/2015 | Fenayon | ................ | F16D 41/06 |
| 9,605,743 B2* | 3/2017 | Canto Michelotti | ..... | F16D 3/12 |
| 9,709,153 B2* | 7/2017 | Chang | .................... | F16H 55/36 |
| 10,520,039 B2* | 12/2019 | Serkh | .................... | F16D 41/206 |
| 10,590,994 B2* | 3/2020 | Antchak | ................ | F02B 67/06 |
| 11,028,884 B2* | 6/2021 | Serkh | .................... | F16H 55/566 |
| 11,236,812 B2* | 2/2022 | Canto Michelotti | ..... | F16D 3/72 |
| 11,448,304 B2* | 9/2022 | Shimamura | ........... | F16D 41/206 |
| 11,549,558 B2* | 1/2023 | Ward | ....................... | F16D 3/72 |
| 11,629,762 B2* | 4/2023 | Antchak | ................... | F16H 7/20 474/94 |
| 11,649,888 B2* | 5/2023 | Serkh | ..................... | F16H 55/36 474/70 |
| 11,708,886 B2* | 7/2023 | Sabti | ........................ | F16D 3/12 474/94 |
| 11,867,275 B2* | 1/2024 | Chen | ....................... | F16H 55/36 |
| 12,117,052 B2* | 10/2024 | Talimi | ..................... | F02B 67/06 |
| 2004/0014540 A1* | 1/2004 | Dell | ......................... | F16H 55/36 474/69 |
| 2006/0247065 A1* | 11/2006 | Bach | ...................... | F16F 15/137 464/68.3 |
| 2008/0194339 A1* | 8/2008 | Antchak | ................ | F16D 7/022 464/40 |
| 2009/0305830 A1* | 12/2009 | Fiordaliso | ................ | F16D 3/80 474/171 |
| 2015/0285365 A1* | 10/2015 | Canto Michelotti | ..... | F16D 3/72 474/94 |
| 2015/0345575 A1* | 12/2015 | Antchak | ................. | F16H 55/36 474/94 |
| 2016/0010742 A1* | 1/2016 | Chang | .................... | F16H 55/36 474/166 |
| 2017/0227108 A1* | 8/2017 | Canto Michelotti | ... | F16H 55/36 |
| 2017/0254366 A1* | 9/2017 | Antchak | ................... | F16D 3/72 |
| 2018/0106355 A1* | 4/2018 | Canto Michelotti | ..... | F16D 3/72 |
| 2019/0063507 A1* | 2/2019 | Serkh | ..................... | F16D 7/022 |
| 2020/0166084 A1* | 5/2020 | Antchak | ................... | F16H 55/36 |
| 2024/0084862 A1* | 3/2024 | Talimi | .................... | B60K 25/02 |

* cited by examiner

FILTERING PULLEY

CROSS-REFERENCE TO RELATED APPLICATIONS

The present invention is filed under 35 U.S.C. § 371 as the U.S. National Phase of International Patent Application No. PCT/IB2022/056727, filed Jul. 21, 2022, which designated the United States and which claims the benefit of Italian Patent Application No. 102021000019376, filed on Jul. 21, 2021, the entire disclosure of which is incorporated herein by reference.

TECHNICAL FIELD

The present invention is related to a filtering pulley, in particular for a belt drive of an internal combustion engine for a motor vehicle.

The present invention finds its preferred, although not exclusive, application in the drive pulley of an internal combustion engine alternator. Reference will be made to this application hereinafter by way of example, it being clear that the pulley of the invention can be used either as a driving pulley connected to the crankshaft or as a driven pulley for dragging any other accessory of the engine itself, e.g., a reversible electric machine with generator and motor function.

STATE OF KNOWN ART

In motor vehicles, the use a filtering pulley for dragging the alternator through the accessory transmission belt is known.

This pulley comprises a hub adapted to be connected to the alternator rotor, an annular crown provided with a profile adapted to cooperate with the belt and a filtering unit interposed between the hub and the pulley crown to avoid exposing the belt to dynamic overloads in the presence of torsional vibrations of the crankshaft or rapid changes in the speed of the engine itself.

The filtering unit generally comprises a spring, e.g., a helical or spiral spring, or a plurality of springs or other resilient members arranged circumferentially between the hub and the crown.

Since the alternator has a relatively high equivalent inertia and tends to drag the pulley in the presence of immediate reductions in the crankshaft speed, it is known to incorporate in the filtering unit a free wheel adapted to transmit unidirectionally the motion of the crown to the hub (normal operating condition) but to decouple the hub from the crown in case of torque inversion.

The introduction of start-stop systems in which a reversible electric machine is used having the function of starting motor or alternator depending on the operating conditions makes it impossible to use a filtering pulley with free wheel because this would decouple the electric machine from the belt transmission when it is a driving electric machine.

To solve this problem, solutions in which the filtering unit comprises a spring constrained at ends thereof to respective members coupled respectively to the hub and to the pulley with a relative freedom of rotation of predetermined amplitude have been proposed.

An example of a known solution to this problem is illustrated in WO 2015/198277 A1. However, this solution is not yet sufficiently optimized to guarantee the desired technical performance. Also, this solution is radially and axially bulky.

Therefore, the need to supply a filtering pulley usable both in a start-stop system and in a conventional transmission system is felt, which allows to solve the above-described problems of the known filtering pulleys.

Another object of the present invention is to provide a filtering pulley which is compact and economical to produce.

SUMMARY OF THE INVENTION

The above object is achieved by a pulley as claimed in the appended independent claims.

Further preferred embodiments of the invention are implemented according to the dependent claims or connected to the aforementioned independent claims.

BRIEF DESCRIPTION OF THE DRAWINGS

For a better understanding of the present invention, a preferred embodiment is described below, by way of non-limiting example, and with reference to the attached drawings in which.

DETAILED DESCRIPTION OF THE INVENTION

Figure 1:
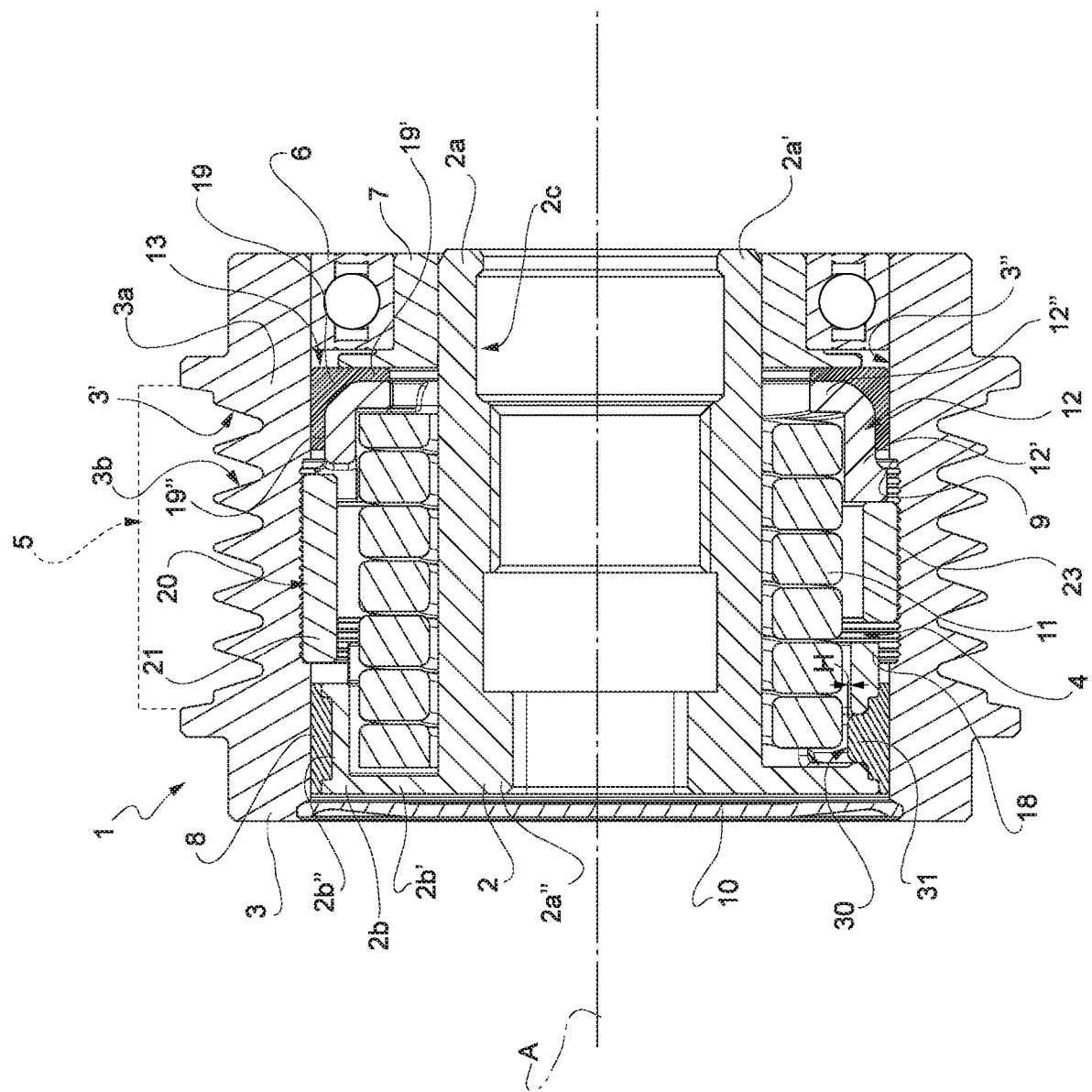
FIG. 1 is a longitudinal sectional view of a pulley according to the invention.
Figure 2:
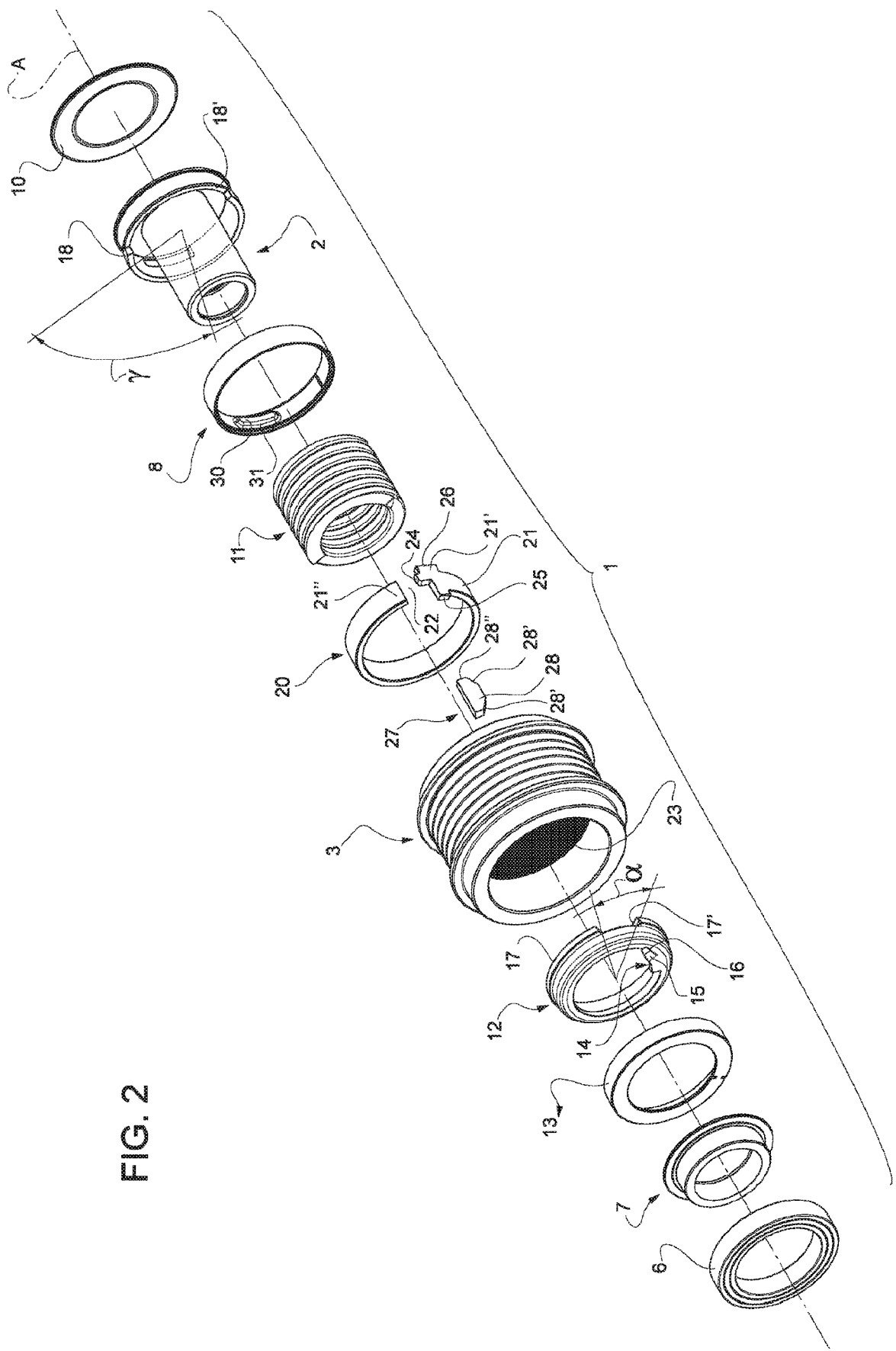
FIG. 2 is an exploded perspective view of the pulley of FIG. 1.
Figure 3:
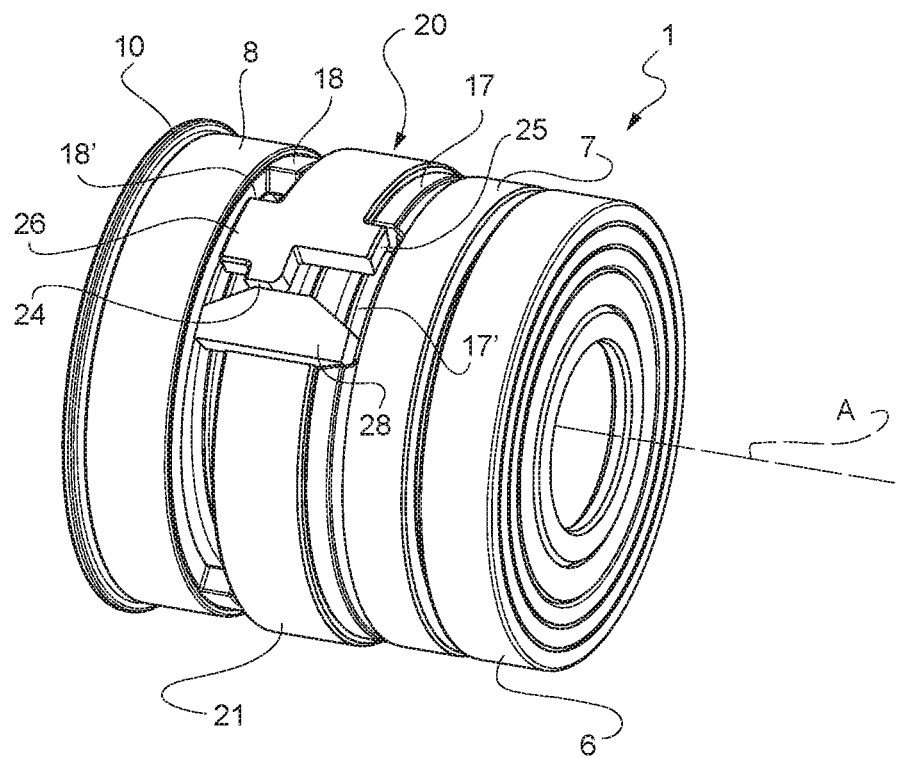
FIGS. 3 and 4 are perspective views, respectively from different angles, of the pulley of FIG. 1 with parts removed for clarity.
Figure 4:
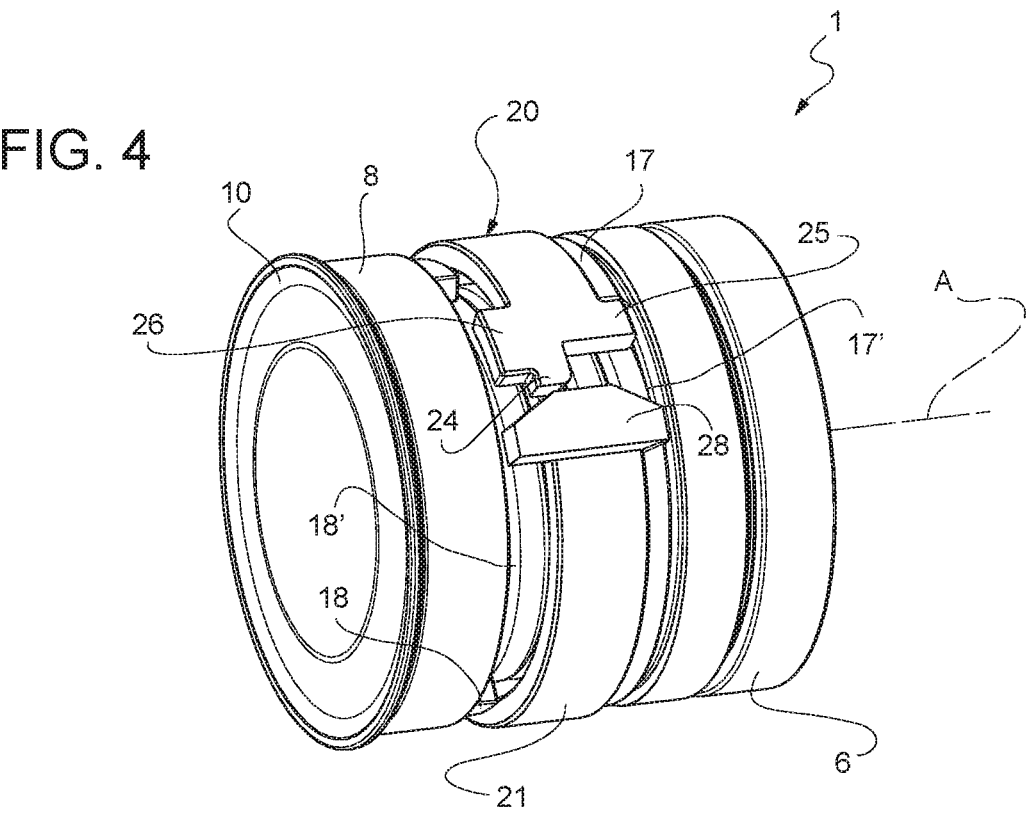

With reference to FIGS. 1 and 2, a pulley 1 essentially comprising a tubular hub 2, a tubular crown 3 externally coaxial to the hub 2 and supported in a rotationally free manner on the latter and a filtering unit 4 for transmitting the torque operationally interposed between the hub 2 and the crown 3 is illustrated. The hub 2 and the crown 3 are coaxial around a longitudinal axis A.

The hub 2 is adapted to be rigidly fixed to a shaft, not shown, of an accessory member of an internal combustion engine, e.g., an alternator or a reversible electric machine with the function of alternator and starting motor in a start-stop system.

In particular, the hub 2 comprises a tubular cylindrical portion 2a internally defining a coupling portion 2c with the aforementioned shaft between a first end 2a' and a second end 2a'' of the cylindrical portion 2a. The hub 2 also comprises a flanged portion 2b extending radially from one 2a'' of the end portions towards the crown 3 and provided with a radial portion 2b' extending perpendicularly to the axis A and a longitudinal portion 2b'' extending cantilevered from radial portion 2b' parallel to the axis A towards the other end 2a' of the hub 2.

The crown 3 essentially comprises an annular portion 3a, which has a profile 3b with multiple grooves adapted to cooperate with a 5-poly-V belt (a section of which is schematically depicted in FIG. 1). The profile 3b is made on an external surface 3' of the crown 3 opposite to an internal surface 3'' cooperating with the filtering unit 4.

The crown 3 is supported on the hub 2 by means of rolling/sliding support means. In particular, the pulley 1 comprises a rolling bearing 6, e.g., a ball bearing, radially interposed between the crown 3 and the first end 2a' of the hub 2. In particular, the rolling bearing 6 is supported on the hub 2 by means of a head member 7 set on the first end 2a', due to the need for assembly of the pulley 1.

On the other hand, the pulley 1 comprises a sliding bearing 8, e.g., a ring made of reduced friction material, radially interposed between the crown 3 and the second end 2a" of the hub 2, i.e., between the longitudinal portion 2b" and the inner surface 3" of the crown 3.

Therefore, between crown 3 and hub 2 a space 9 radially delimited between the internal surface 3" of the crown 3 surface of the cylindrical portion 2a of and the external the hub 2 and axially delimited between the rolling/sliding support means described above is defined.

The pulley 1 can also comprise a cover 10 configured to axially delimit one of the ends of the pulley 1, and advantageously configured to be housed inside the crown 3, i.e., cooperating radially in contact with the latter.

The filtering unit 4 is housed in the space 9 and essentially comprises a torsion spring 11, a spring-holder member 12, hereinafter referred to as carrier, cooperating with one end of the spring 11 and a damping ring 13 axially interposed between the carrier and the head member 7.

Figure 5:
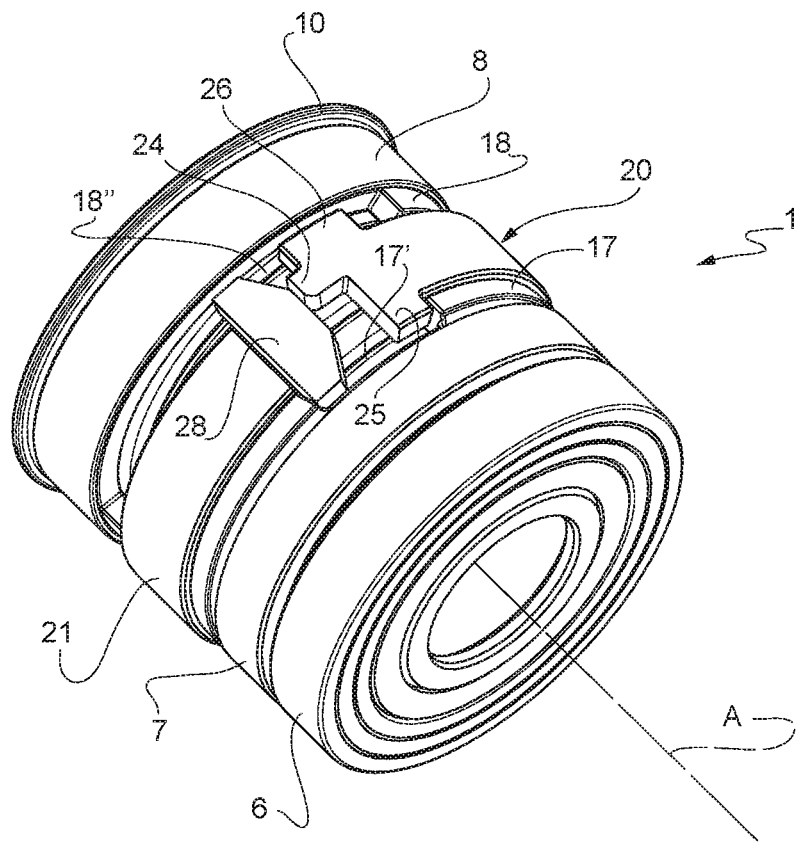
FIGS. 5 and 6 are perspective views of respective members forming part of the pulley according to the invention.
Figure 6:
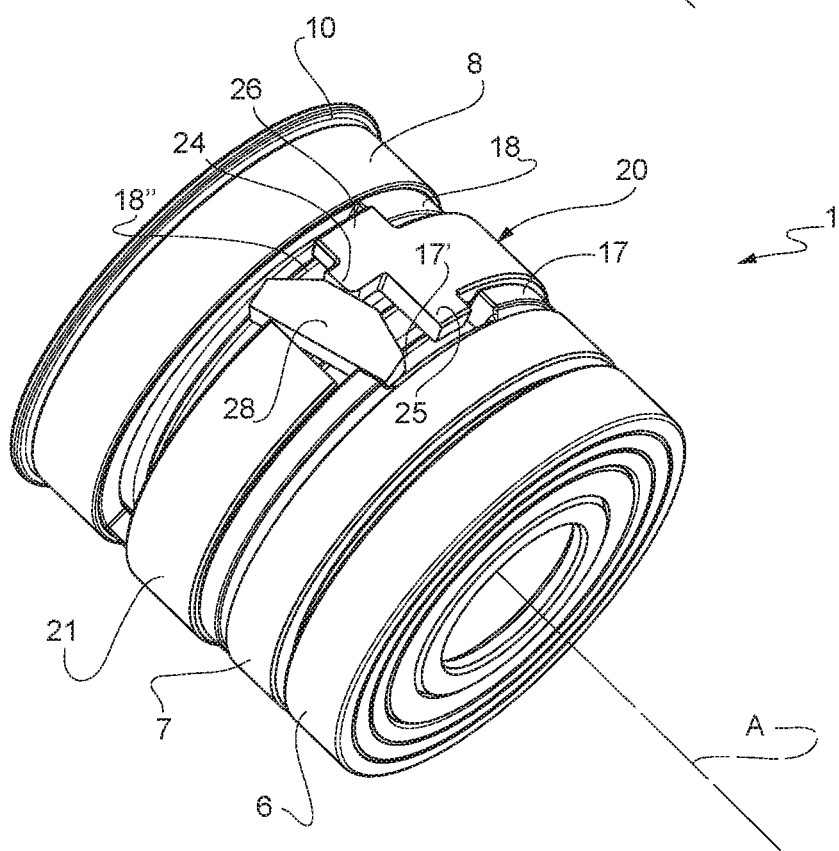

The carrier 12 cooperates in contact by sliding, i.e., it slides axially in contact with the head member 7. With reference to FIGS. 1 and 5, the carrier 12 is annular in shape and defines an annular wall 12' coaxial to the axis A and a radial wall 12' radially extending towards the axis A starting from an axial edge of the annular portion 12'.

This radial wall 12" is configured to cooperate slidingly with the head 7 from a first side, while from a second side opposite to the previous one it defines an internal radial protrusion 14 configured to house a spring-retaining member 15. In particular, the spring-retaining member 15 comprises an axial projection 16 extending axially along the axis A from the internal radial protrusion 14 and configured to cooperate in contact with one end of the spring 11.

The annular wall 12' also defines an axial projection 17 extending axially along the axis A from the axial edge of the annular portion 12' opposite the radial wall 12" the function of which will be described below. In particular, the axial projection 17 extends circumferentially around the axis A leaving a free seat 17' with an angle α comprised between 20° and 180°, advantageously between 45° and 50° and more preferably 47°.

As seen in FIGS. 3 to 6, the longitudinal portion 2b' 'of the hub 2 defines a projection 18 extending axially along the axis A with respect to the longitudinal portion 2b'' towards the carrier 11. In particular, the axial projection 8 extends circumferentially around the axis A leaving a free seat 18' with an angle β comprised between 20° and 180°, advantageously between 45° and 50° and more preferably 47°.

The spring 11 is preferably a helical spring with a rectangular section wire and comprising a plurality of coils winding around the axis A between the carrier 12 and the flanged portion 2b of the hub 2. As stated above, an end portion of the spring 11 cooperates in contact with the spring holder 15 while the opposite end cooperates in contact with a respective, invisible spring holder formed in the flanged portion 2b. Consequently, the flanged portion 2b is configured to wind the spring 11 partially externally.

The damper 13 essentially comprises an annular member 19 made of polymeric material having an "L"-shaped section and therefore provided with a longitudinal portion 19' radially interposed between the carrier 12 and the inner surface 3" of the crown 3 and an axial portion 19' axially interposed between the carrier 12 and the head 7. The annular member 19 is coupled, by friction or by shape coupling, to the carrier 12 and therefore is integral with it around the axis A.

The pulley 1 also comprises a torque limiting joint 20 essentially comprising a ribbon spring 21 (FIGS. 3 to 6) housed in the space 9 and configured to simultaneously perform the freewheeling function in both directions of relative rotation between the crown 3 and hub 2. Advantageously, this freewheeling effect is provided at different levels of torque that can be transmitted between hub 2 and crown 3 in one direction with respect to another.

In particular, the torque limiting joint 20 is sized to cooperate in contact with the hub 2 and the carrier 12 to uncouple the crown 3. In particular, the limiting joint 21 is housed in the space 9 in contact with the internal surface 3" of the crown 3.

In greater detail, the ribbon spring 21 substantially has the shape of an open ring with two delimiting ends 21', 21" delimiting a space 22 among them. The ribbon spring 21 is mounted with radial interference inside the internal radial surface 3" of the crown 3, in particular in a machined area 23. In particular, the zone 23 is machined to define a grooved/wavy surface, of the "millerays" type of dimensions adapted t allow a predefined friction between the ribbon spring 21 and the crown 3.

The ribbon spring 21 has a substantially constant axial dimension throughout its circumferential extension and is preferably of rectangular section.

However, one 21' of the two end portions 21" defines at least one projection 24, 25, 26. In particular, according to the described embodiment,
 a first projection 24 extends in a circumferential direction starting from the end portion 21' towards the opposite end portion 21" inside the space 22
 a second projection 25 extends axially along the axis A from an axial edge of the ribbon spring 21 towards the carrier 12; and
 a third projection 26 extends axially along the axis A from an axial edge of the ribbon spring 21 towards the flanged portion 2b of the hub 2.

The second projection 25 is axially dimensioned to cooperate in contact in a circumferential direction with the projection 17 defined by the carrier 12 while the third projection 26 is axially dimensioned to cooperate in contact in a circumferential direction with the projection 18 defined by the hub 2.

The torque limiting joint 20 also comprises an actuator member 27 housed in the space 22 and configured to cooperate in contact with the projections 17, 18 to increase or decrease the opening of the ribbon spring 21 when the actuator member operates with them.

Advantageously, the actuator member 27 comprises a metal lever 28, housed in the space 22 and circumferentially interposed between the end portions 21', 21" of the ribbon spring 21 and configured to cooperate in contact with the projection 24 and the end portion 21", circumferentially, and extending in an axial direction to cooperate in circumferential contact with the projections 17 and 18 of the carrier 12 and the hub 2, respectively.

In particular, the lever 28 has a trapezoidal shape where the trapezoidal shape plan is in the circumferential direction and the thickness in the radial direction with respect to the axis A. Therefore, in particular the lever 28 comprises a central portion 28' of substantially rectangular shape and a pair of tapered side portions 28" advantageously equal to each other.

Preferably, the angle of inclination of the side portions 28" with respect to the central portion 28' is comprised between 20° and 40°, preferably 30°.

Furthermore, the pulley 1 comprises damping means 30 configured to impart variable damping as a function of the load transmitted between crown 3 and hub 2.

In particular, the damping means 30 are carried by the sliding bearing 8. In greater detail, the damping means 30 comprise a projection 31 extending circumferentially along an angle γ and radially towards the torsion spring 11.

For this purpose, the flanged portion 2b of the hub 2, in particular the longitudinal portion 2b', has a seat 32, passing through the flanged portion 2b itself and configured to allow the passage of the projection 31 and exit thereof by a predetermined distance H with respect to its inner surface.

The distance H and the angle γ are predetermined, respectively, to select the torque from which the damping provided by the damping means 30 is to be applied and the value thereof.

Advantageously, the projection 31 has a substantially rectangular section and is made of polymeric material and in one piece with the sliding bearing 8.

The operation of the embodiment of the pulley 1 according to the invention described above is as follows.

In normal conditions, i.e., when the crown 3 dragged by the belt 4 drives the hub 2 and therefore tends to overrun it ("drive mode"), the spring 21 rotates integrally with the crown 3 and the hub 2 is resisting.

By envisioning a starting condition in which one of the side portions 28" of the actuator 28 is in contact with the projection 18, the ribbon spring 21 will tend to move clockwise with respect to the axis A dragged by the crown 3. The actuator 28 moves inside the seat 18' (FIG. 5) until (FIG. 6) the projection 26 of the spring 21 comes into contact with the projection 18. Starting from this condition, the lever 28 is inclined as it is pushed tangentially between the portions 21', 21" by the thrust between the projection 17 and the opposite side portion 28". In this way, the opening increases, increasing the adhesion between the latter and the internal surface of the crown 3. During this movement, the projection 25 operates in contact with the projection 17 of the head member 7. In this way, the spring 11 is torsionally loaded and transmits torque to the hub 2 being constrained in the opposite flanged portion 2b. If the torque transmitted by the crown 3 continues to increase, at a certain point the ribbon spring 21 slips with respect to the internal surface 3" of the crown 3, lacking the necessary adherence and thus decoupling the crown 3 and the hub 2.

On the other hand, if the hub 2 tends to overrun the crown 3 ("overrunning"), the spring 21 rotates integrally with the crown 3 and is resisting with respect to the hub 2.

By envisioning the uncoupled condition described above, the crown 3 will tend to rotate counterclockwise with respect to the hub 2, thus decoupling the lever 28 from the projection 18. In this condition, the spring 11 will tend to unload and the ribbon spring 21, carried by the crown 3, will continue to rotate counterclockwise, dragged by the projection 17 in contact with the projection 25 inside the seat 17'. This condition continues until the lateral portion 28" of the lever 28 come in contact with the projection 17 on the other side of the seat 17 and tends to close the sliding spring 21.

If the lever 28 is not present, the operation is similar and in the driving torque condition the coupling takes place directly between the projections 17, 18 and 25, 26.

During the expansion, in both directions, the torsion spring 12 tends to expand radially outwards as a function of the torque transmission value, i.e., towards the crown 3. In the area of the flanged portion 2b, after a certain radial expansion the torsion spring cooperates in contact with the projection 31. The contact between the spring and the projection 31 produces a damping due to the sliding contact between the spring 12 and the projection 21.

Figure 7:
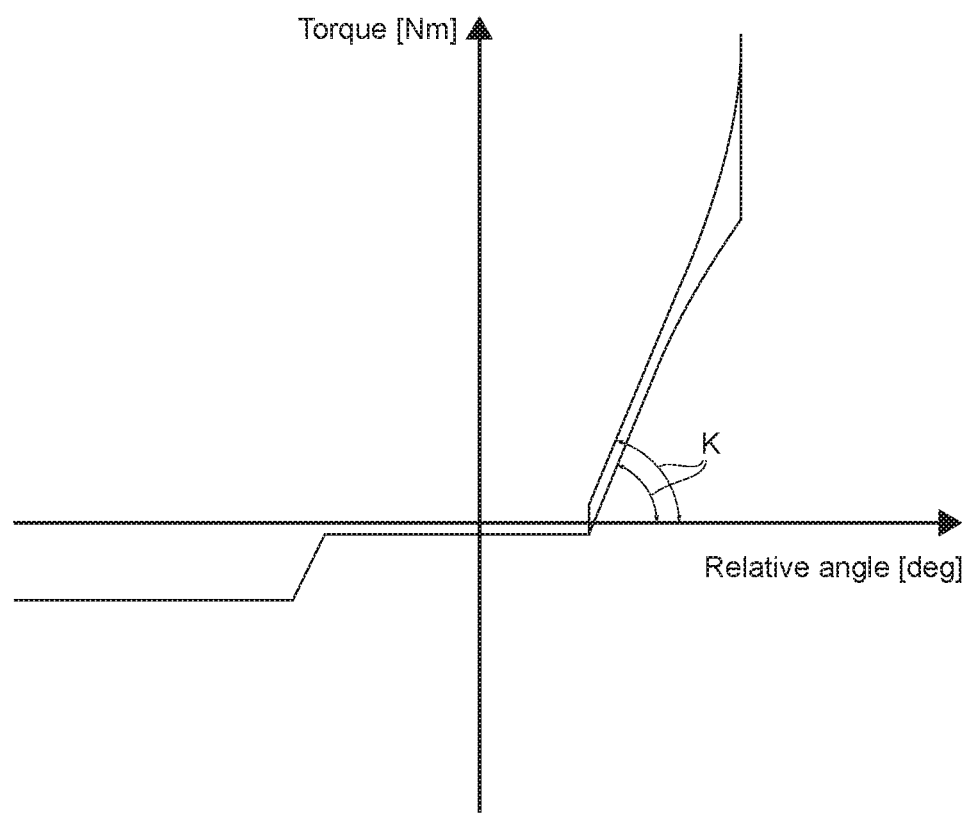
FIG. 7 is a graph representing the transmitted torque as a function of the relative rotation angle between two members of the pulley according to the invention.

FIG. 7 shows a graph of the transmitted torque as a function of the relative rotation angle between crown 3 and hub 2.

In the "drive mode" it can be seen that the characteristic increases linearly, according to an inclination K due to the stiffness of the torsional spring 11, up to the maximum torque value T1, defined above, passing through a step representing the direct coupling between crown 3 and hub 2. In the opposite direction, there is still a linear characteristic of inclination K but with a decoupling at a lower torque value T2 than in the previous case.

Clearly, before coupling K there is an angular clearance equal to the free sliding distance between the projections 26 and 18.

As can also be seen, the end portions of the drive mode characteristics tend to bend due to the damping means 30. In particular, the curve grows exponentially as the greater the expansion of the torsion spring, the greater the damping provided by the damping means themselves.

From the above, the advantages of a pulley 1 according to the invention are clear.

Compared to known solutions which provide for the use of a free wheel, the present invention equipped with a torque limiting joint 20 allows to obtain a bidirectional coupling between hub and pulley, at least within a predetermined torque range, making it possible to use the pulley in start-stop systems.

In particular, due to the damping system 30 it is possible to provide additional damping only at large applied torque values, increasing as a function of the torque itself. In this way the filtering of the pulley 1 is considerably improved.

Furthermore, the fact that the damping system 30 is integrated with the sliding bearing 8 allows to provide damping in a compact and economical way.

Furthermore, the fact that the protrusion H is variable according to the needs allows to set the torque value at which to make the damping act in a versatile and easy to implement way.

Furthermore, for the solutions described, the angular limiting function is carried out directly by the torque limiting joint 20, suitably sized. In particular, due to the different angular intervals α, β, it is possible to optimize these values between driving torque and overruning.

In particular, the angle β is particularly reduced in order to guarantee the sliding of the spring as soon as an over-runing condition is detected, thus avoiding impacts that cause noise and reduce the operating life of the pulley 1.

Furthermore, the trapezoidal shape of the lever 28 is particularly optimized in order to guarantee the opening of the spring 21 and sufficient structural strength, at the same time.

In general, the filtering pulley illustrated here has low radial and axial dimensions and has a limited number of members. Therefore, the manufacture thereof is economical, and the assembly thereof is facilitated.

Finally, it is clear that modifications and variations can be made to the pulley 1 according to the present invention, which however do not depart from the protection scope defined by the claims.

In particular, the spring 21 could be coupled to the hub 2 instead of the crown 3.

Furthermore, the shape of the projection 31 or the seat 32 and the distance H can vary according to the design requirements.

As mentioned, the lever 28 can be omitted if the adherence between the spring 21 and the surface 3" of the crown 3 (or the hub 2) in the drive mode is sufficient to transmit the required torques.

The pulley can be used as a driving pulley on the crankshaft rather than on the alternator and can also be used on a conventional alternator or any other accessory.

The invention claimed is:

1. Filtering pulley for an accessory transmission of an internal combustion engine, comprising:
   a hub,
   an annular crown provided with a profile configured to cooperate with a transmission belt, externally coaxial around an axis (A) to said hub and supported in rotationally free motion on the hub itself,
   a filtering unit for transmitting torque interposed between said hub and said crown, the filtering unit comprising a torsion spring, a carrier and a torque limiting joint cooperating with each other to transmit a torque between said hub and said crown,
   damping means carried by a member integral with one of said hub and said crown, said damping means being configured to provide variable damping according to said torque, and
   a sliding bearing radially interposed between said hub and said crown, said damping means being carried by said sliding bearing.

2. The filtering pulley according to claim 1, wherein said sliding bearing is integrally carried by said hub.

3. The filtering pulley according to claim 1, wherein said hub defines a flanged portion extending radially outward around part of said torsion spring, said sliding bearing being carried by said flanged portion.

4. The filtering pulley according to claim 3, wherein said flanged portion defines a seat passing through said flanged portion, said damping means comprising a projection housed in said seat—and extending radially towards said torsion spring.

5. The filtering pulley according to claim 4, wherein said projection is radially spaced from said torsion spring by a distance (H), said distance (H) being predetermined as a function of the torque from which said damping has to be applied.

6. The filtering pulley according to claim 4, in which said seat and said projection extend by an angle (γ) in a circumferential direction around said axis, said angle (γ) being predetermined as a function of damping to be imparted between said hub and said crown.

7. The filtering pulley according to claim 1, in which said sliding bearing is made of polymeric material and damping means are made of one piece with said sliding bearing.

8. The filtering pulley according to claim 3, wherein said carrier cooperates by sliding with respect to a portion integral with either said hub or said crown, said carrier defining a door spring and a projection extending along said axis (A) and configured to cooperate with said torque limiting joint, wherein said torsion spring is operatively interposed between said carrier and whichever of said said hub and said crown comprise the portion integral therewith and is provided with two ends cooperating in contact with respective spring holders integral with said carrier and whichever of said said hub and said crown comprise the portion integral therewith, wherein said torque limiting joint is torqued to interference on one surface of the other between said crown and said hub; and said torque limiting joint comprises an open loop ribbon spring and is configured to slide with respect to said surface when the torque transmitted between said crown and said hub reaches a predetermined level (T1, T2).

9. The filtering pulley according to claim 8, wherein said surface is made on said crown, said carrier slides with respect to said hub and said spring is operatively interposed between said carrier and said hub.

10. The filtering pulley according to claim 8, wherein said ribbon spring defines a pair of axial projections configured to cooperate selectively circumferentially in contact with respective axial projections integral with said hub.

11. The filtering pulley according to claim 10, wherein a free angle between said crown is defined between said projections or said seat of said ribbon spring and said projections of said crown and said hub.

12. The filtering pulley according to claim 8, wherein said ribbon spring defines an axial projection extending on the opposite side to said pair of projections, said projection being configured to cooperate in circumferential contact with said projection of said carrier.

13. The filtering pulley according to claim 10, wherein said torque limiting joint comprises an actuator member housed in a space circumferentially delimited between two ends of said ribbon spring, said actuator member being axially dimensioned to cooperate in contact, on the one hand, with said projection of said carrier and, on the other, one of said projections of said hub.

14. The filtering pulley according to claim 10, wherein said projections are formed on said flanged portion.

* * * * *